United States Patent
Woo et al.

(10) Patent No.: US 10,805,027 B2
(45) Date of Patent: Oct. 13, 2020

(54) METHOD, DEVICE, AND NON-TRANSITORY COMPUTER-READABLE RECORDING MEDIUM FOR SUPPORTING RELAY BROADCAST

(71) Applicant: 39DEGREES C INC., Seoul (KR)

(72) Inventors: Seung Won Woo, Seoul (KR); Hyun Goo Park, Seoul (KR)

(73) Assignee: 39DEGREES C INC., Seoul (KR)

( * ) Notice: Subject to any disclaimer, the term of this patent is extended or adjusted under 35 U.S.C. 154(b) by 0 days.

(21) Appl. No.: 16/547,361

(22) Filed: Aug. 21, 2019

(65) Prior Publication Data
US 2019/0379472 A1    Dec. 12, 2019

Related U.S. Application Data

(63) Continuation of application No. PCT/KR2018/002146, filed on Feb. 21, 2018.

(30) Foreign Application Priority Data

Feb. 21, 2017    (KR) ........................ 10-2017-0023080

(51) Int. Cl.
| | |
|---|---|
| *H04N 9/80* | (2006.01) |
| *H04H 20/08* | (2008.01) |
| *H04H 60/37* | (2008.01) |
| *H04N 21/81* | (2011.01) |
| *H04N 5/93* | (2006.01) |

(52) U.S. Cl.
CPC .......... *H04H 20/08* (2013.01); *H04H 60/375* (2013.01); *H04N 21/812* (2013.01)

(58) Field of Classification Search
CPC .... H04H 20/08; H04H 60/375; H04N 21/236; H04N 21/434; H04N 21/6437; H04N 21/812; H04N 21/85
USPC ................ 386/248, 278, 281, 285, 290, 239
See application file for complete search history.

(56) References Cited

U.S. PATENT DOCUMENTS

2014/0013361 A1\*    1/2014    Monari .............. H04N 5/23238
725/62

FOREIGN PATENT DOCUMENTS

| KR | 10-2011-0129559 A | 12/2011 |
|---|---|---|
| KR | 10-1107865 A | 2/2012 |
| KR | 10-1604002 B1 | 3/2016 |

\* cited by examiner

*Primary Examiner* — Robert Chevalier
(74) *Attorney, Agent, or Firm* — Li & Cai Intellectual Property (USA) Office

(57) ABSTRACT

According to one aspect of the invention, there is provided a method for supporting a relay broadcast, comprising the steps of: acquiring real-time data containing videos or audios captured or recorded in real time by at least one device, and acquiring non-real-time data containing pre-stored videos or audios; according to an editing input from a user, extracting processed non-real-time data of the same format as the real-time data from the non-real-time data, and generating metadata related to editing of a relay broadcast content containing the real-time data and the processed non-real-time data; and transmitting the real-time data and the processed non-real-time data contained in the relay broadcast content and the metadata to another device or an external server.

10 Claims, 3 Drawing Sheets

METHOD, DEVICE, AND NON-TRANSITORY COMPUTER-READABLE RECORDING MEDIUM FOR SUPPORTING RELAY BROADCAST

CROSS-REFERENCE TO RELATED APPLICATION(S)

This application is a continuation application of Patent Cooperation Treaty (PCT) International Application Ser. No. PCT/KR2018/002146, filed on Feb. 21, 2018, which claims priority to Korean Patent Application Serial No. 10-2017-0023080, filed on Feb. 21, 2017. The entire contents of PCT International Application Ser. No. PCT/KR2018/002146, and Korean Patent Application Serial No. 10-2017-0023080 are hereby incorporated by reference.

FIELD OF THE INVENTION

The present invention relates to a method, device, and non-transitory computer-readable recording medium for supporting a relay broadcast.

BACKGROUND

Since a lot of hardware resources (e.g., CPUs and memories) are required to process video signals or audio signals, there is a need for expensive high-end equipment in order to produce a relay broadcast signal by processing and editing in real time a plurality of video signals and audio signals inputted through various channels. Although the performance of broadcasting equipment has been increased and popularized in recent years due to the development of broadcasting communication technology, the resolution and quality of video signals and audio signals to be processed by the equipment have also been increased. Thus, it is still difficult to process and edit a plurality of video signals and audio signals without using expensive high-end equipment.

Particularly, although general users can create their own videos or audios using a camera or microphone provided in a mobile device such as a smart phone or tablet, only simple processing (e.g., uploading or downloading video signals or audio signals generated by the users) can be performed due to the limited performance of the mobile device, and it is difficult to produce a relay broadcast content in which various video signals and audio signals are combined. Accordingly, there is a limitation in utilizing videos and audios that can be created using a mobile device in various forms.

Meanwhile, in recent years, one-person media in which individual users create and broadcast their own content have been popularized, and the types of contents provided by such one-person media have been diversified. Accordingly, there is a growing demand of users to produce diverse contents that even contain various video data or audio data such as pre-stored advertisement contents, away from creating monotonous contents only composed of video data or audio data captured or recorded in real time.

SUMMARY OF THE INVENTION

One object of the present invention is to solve all the above-described problems.

Another object of the invention is to allow a user to produce a relay broadcast content containing not only real-time video data or real-time audio data captured or recorded in real time using a mobile device, but also non-real-time video data or non-real-time audio data pre-stored in the mobile device or a storage, by acquiring real-time data containing videos or audios captured or recorded in real time by at least one device, and acquiring non-real-time data containing pre-stored videos or audios; according to an editing input from a user, extracting processed non-real-time data of the same format as the real-time data from the non-real-time data, and generating metadata related to editing of a relay broadcast content containing the real-time data and the processed non-real-time data; and transmitting the real-time data and the processed non-real-time data contained in the relay broadcast content and the metadata related to the editing to another device or an external server.

The representative configurations of the invention to achieve the above objects are described below.

According to one aspect of the invention, there is provided a method for supporting a relay broadcast, comprising the steps of: acquiring real-time data containing videos or audios captured or recorded in real time by at least one device, and acquiring non-real-time data containing pre-stored videos or audios; according to an editing input from a user, extracting processed non-real-time data of the same format as the real-time data from the non-real-time data, and generating metadata related to editing of a relay broadcast content containing the real-time data and the processed non-real-time data; and transmitting the real-time data and the processed non-real-time data contained in the relay broadcast content and the metadata to another device or an external server.

According to another aspect of the invention, there is provided a device for supporting a relay broadcast, comprising: a data acquisition unit configured to acquire real-time data containing videos or audios captured or recorded in real time by at least one device, and acquire non-real-time data containing pre-stored videos or audios; a relay broadcast content editing unit configured to, according to an editing input from a user, extract processed non-real-time data of the same format as the real-time data from the non-real-time data, and generate metadata related to editing of a relay broadcast content containing the real-time data and the processed non-real-time data; and a relay broadcast content transmission unit configured to transmit the real-time data and the processed non-real-time data contained in the relay broadcast content and the metadata to another device or an external server.

In addition, there are further provided other methods and devices to implement the invention, as well as computer-readable recording media having stored thereon computer programs for executing the methods.

According to the invention, it is possible to allow a user to produce a relay broadcast content containing not only real-time video data or real-time audio data captured or recorded in real time using a mobile device, but also non-real-time video data or non-real-time audio data pre-stored in the mobile device or a storage, so that general users may easily produce relay broadcast contents including diverse and rich contents.

According to the invention, a user may insert an advertisement content in a real-time relay broadcast content, so that even in a video platform that restricts the add-on of a separate advertisement content or does not provide a separate tool for inserting an advertisement (e.g., YouTube, Facebook, and Instagram), a user of one-person media may freely insert a desired advertisement content in a real-time relay broadcast content produced by the user.

According to the invention, even when non-real-time data are inserted in a relay broadcast content containing real-time data, it is possible to reproduce the relay broadcast content (particularly, the real-time data) in a video platform server without the occurrence of time delay or stuttering.

According to the invention, it is possible to produce a real-time relay broadcast content without processing of video data or audio data which requires a large amount of operation resources, so that a user may easily produce a desired real-time relay broadcast content using a conventional mobile device and communication network.

DETAILED DESCRIPTION

Figure 1:
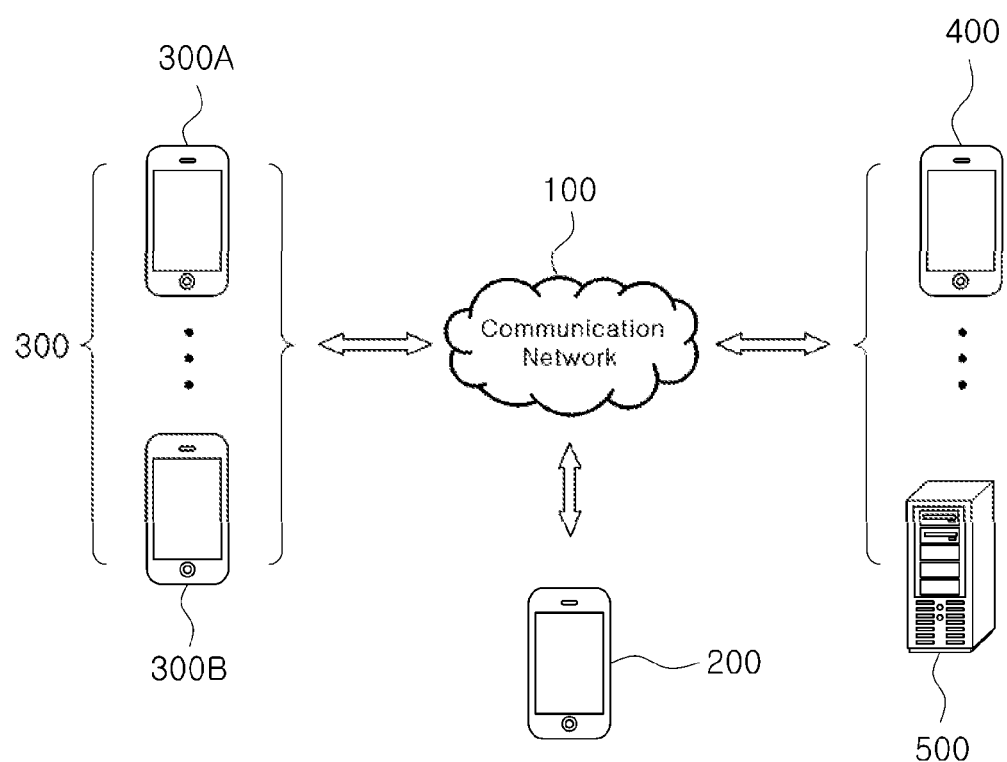
FIG. 1 illustratively shows the configuration of an entire system for implementing the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the disclosed embodiments may also be modified without departing from the spirit and scope of the invention. Therefore, the following detailed description is not to be taken in a limiting sense, and the scope of the invention, if properly described, is limited only by the appended claims together with all equivalents thereof. In the drawings, like reference numerals refer to the same or similar functions throughout the several views.

Hereinafter, preferred embodiments of the present invention will be described in detail with reference to the accompanying drawings to enable those skilled in the art to easily implement the invention.

Configuration of the Entire System

FIG. 1 illustratively shows the configuration of the entire system for implementing the invention.

As shown in FIG. 1, the entire system according to one embodiment of the invention may comprise a communication network 100, a relayer device 200, a photographer device 300, a viewer device 400, and an external server 500.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may include a known short-range wireless communication network such as a Wi-Fi network, a Wi-Fi Direct network, a LTE (Long Term Evolution) Direct network, and a Bluetooth network. However, the communication network 100 is not necessarily limited thereto, and may at least partially include known wired/wireless data communication networks, known telephone networks, or known wired/wireless television communication networks.

Next, according to one embodiment of the invention, the relayer device 200 may function to allow a user to produce a relay broadcast content containing not only real-time video data or real-time audio data captured or recorded in real time using a mobile device, but also non-real-time video data or non-real-time audio data pre-stored in the mobile device or a storage, by acquiring real-time data containing videos or audios captured or recorded in real time by at least one photographer device 300 or the relayer device 200, and acquiring non-real-time data containing videos or audios pre-stored in the relayer device 200 or a storage (not shown); according to an editing input from a user, extracting processed non-real-time data of the same format as the real-time data from the non-real-time data, and generating metadata related to editing of a relay broadcast content containing the real-time data and the processed non-real-time data; and transmitting the real-time data and the processed non-real-time data contained in the relay broadcast content and the metadata related to the editing to the viewer device 400 or the external server 500.

Meanwhile, according to one embodiment of the invention, any type of digital device having a memory means and a microprocessor for computing capabilities, such as a smart phone, a tablet, a desktop computer, a notebook computer, a workstation, a personal digital assistant (PDA), a web pad, and a mobile phone, may be adopted as the relayer device 200 according to the invention.

The configuration and functions of the relayer device 200 according to the invention will be described in detail later.

Next, according to one embodiment of the invention, the photographer device 300 is a digital device capable of transmitting video data or audio data captured or recorded by a photographer to the relayer device 200, and any type of digital device having a memory means and a microprocessor for computing capabilities, such as a smart phone, a tablet, a desktop computer, a notebook computer, a workstation, a personal digital assistant (PDA), a web pad, and a mobile phone, may be adopted as the photographer device 300 according to the invention.

Next, according to one embodiment of the invention, the viewer device 400 is a digital device capable of receiving the video data, audio data and metadata contained in the relay broadcast content transmitted from the relayer device 200, and reproducing the relay broadcast content using the data, and any type of digital device having a memory means and a microprocessor for computing capabilities, such as a smart phone, a tablet, a desktop computer, a notebook computer, a workstation, a personal digital assistant (PDA), a web pad, and a mobile phone, may be adopted as the viewer device 400 according to the invention.

Particularly, according to one embodiment of the invention, the relayer device 200, the photographer device 300 and the viewer device 400 may include a dedicated application (not shown) configured to support the production of a relay broadcast content. The application may be downloaded from an external service provision server (not shown).

Meanwhile, although the characteristic functions that may be respectively performed by the relayer device 200, the photographer device 300 and the viewer device 400 are mainly described herein, it is noted that the relayer device 200, the photographer device 300 and the viewer device 400 do not necessarily perform their respective characteristic functions only. That is, the mobile device may act as any of the relayer device 200, the photographer device 300 and the viewer device 400 according to how it is used.

For example, a mobile device of a user may act as the photographer device 300 when the user performs capturing or recording using the mobile device, may act as the relayer device 200 when the user performs relaying using the mobile device, and may act as the viewer device 400 when the user performs viewing using the mobile device.

As another example, a mobile device of a user may act as the relayer device 200 and the photographer device 300 at the same time when the user captures video data and performs relaying at the same time using the mobile device.

Meanwhile, according to one embodiment of the invention, the external server 500 may be a server capable of receiving the video data, audio data and metadata contained in the relay broadcast content transmitted from the relayer device 200, and providing (i.e., streaming) the relay broadcast content to at least one other viewer device (not shown) using the data. For example, the external server 500 may be a server operating a platform for providing videos or relay broadcasts (e.g., YouTube, Facebook, and Instagram).

Configuration of the Relayer Device

Hereinafter, the internal configuration of the relayer device 200 crucial for implementing the invention and the functions of the respective components thereof will be discussed.

Figure 2:
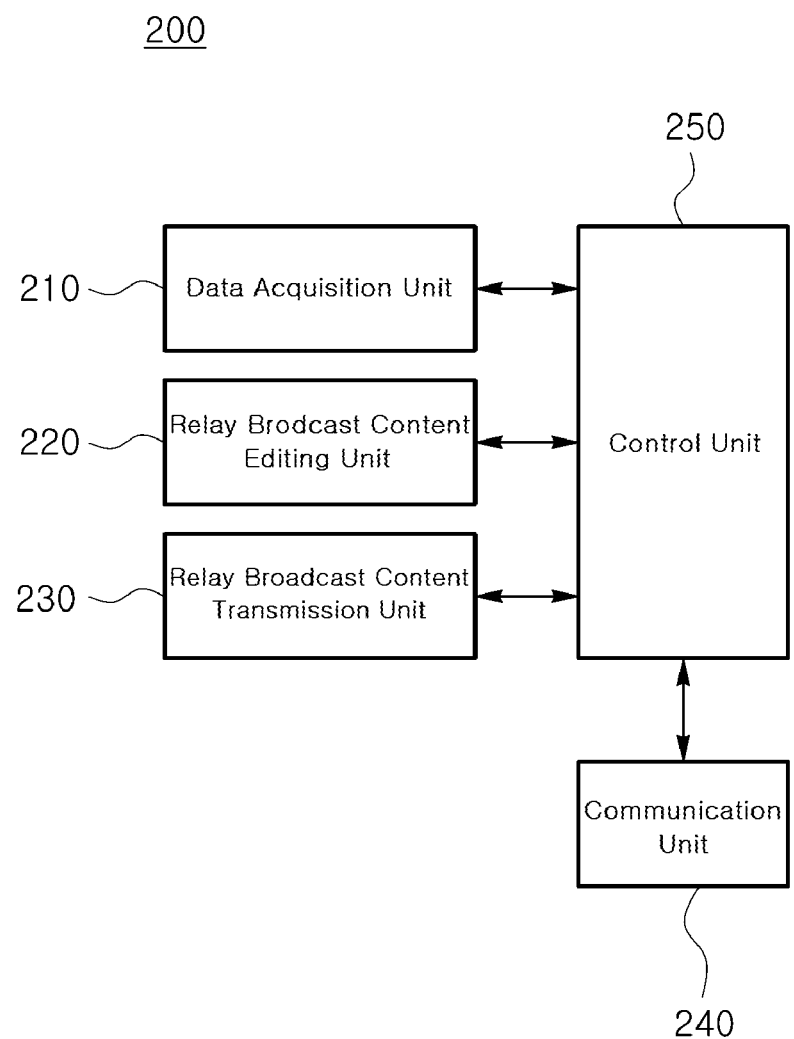
FIG. 2 illustratively shows the internal configuration of a device according to one embodiment of the invention.

FIG. 2 illustratively shows the internal configuration of the relayer device 200 according to one embodiment of the invention.

Referring to FIG. 2, the relayer device 200 according to one embodiment of the invention may comprise a data acquisition unit 210, a relay broadcast content editing unit 220, a relay broadcast content transmission unit 230, a communication unit 240, and a control unit 250. According to one embodiment of the invention, at least some of the data acquisition unit 210, the relay broadcast content editing unit 220, the relay broadcast content transmission unit 230, the communication unit 240, and the control unit 250 may be program modules to communicate with the relayer device 200. The program modules may be included in the relayer device 200 in the form of operating systems, application program modules, and other program modules, while they may be physically stored in a variety of commonly known storage devices. Further, the program modules may also be stored in a remote storage device that may communicate with the relayer device 200. Meanwhile, such program modules may include, but not limited to, routines, subroutines, programs, objects, components, and data structures for performing specific tasks or executing specific abstract data types as will be described below in accordance with the invention.

First, according to one embodiment of the invention, the data acquisition unit 210 may function to acquire real-time video data or real-time audio data captured or recorded in real time by at least one device (e.g., the photographer device 300 or the relayer device 200).

Further, according to one embodiment of the invention, the data acquisition unit 210 may function to acquire non-real-time video data or non-real-time audio data pre-stored in the relayer device 200 or another storage (not shown).

Specifically, according to one embodiment of the invention, the real-time video data or real-time audio data acquired from the photographer device 300 may be in the format of raw data (i.e., no additional processing such as encoding, decoding and compression for editing or relaying is performed in a state in which the corresponding data are initially generated). Further, according to one embodiment of the invention, the real-time video data acquired from the photographer device 300 may be composed of a plurality of images containing still images, and the plurality of images may constitute the real-time video data at a frame rate of one or more frames per second.

Meanwhile, according to one embodiment of the invention, there may be more than one photographer device 300 that captures or records the real-time video data or real-time audio data provided to the relayer device 200. Specifically, according to one embodiment of the invention, the real-time video data may include first real-time video data acquired from a first photographer device 300A and second real-time video data acquired from a second photographer device 300B, and the real-time audio data may include first real-time audio data acquired from the first photographer device 300A and second real-time audio data acquired from the second photographer device 300B.

Further, according to one embodiment of the invention, the non-real-time video data or non-real-time audio data acquired by the relayer device 200 may include advertisement content data pre-stored in the relayer device 200 or another storage (not shown).

Next, according to one embodiment of the invention, the relay broadcast content editing unit 220 may function to, according to an editing input from a user, extract processed non-real-time video data or processed non-real-time audio data of the same format as the real-time video data or real-time audio data from the non-real-time video data or non-real-time audio data. For example, when the real-time video data are composed of a plurality of frames being bitmap images, the processed non-real-time video data may also be composed of a plurality of frames being bitmap images.

Further, according to one embodiment of the invention, the relay broadcast content editing unit 220 may function to, according to an editing input from the user, generate metadata related to editing of a relay broadcast content containing at least one of the real-time video data, the real-time audio data, the processed non-real-time video data, and the processed non-real-time audio data.

Specifically, according to one embodiment of the invention, the processed non-real-time video data or processed non-real-time audio data may be inserted in the relay broadcast content at a time point or time period specified by an operation from the user.

Further, according to one embodiment of the invention, the metadata related to editing of the relay broadcast content may include information on switching between the real-time video data and the processed non-real-time video data, information on switching between the real-time audio data and the processed non-real-time audio data, information on combination between at least one of the real-time video data and the processed non-real-time video data and at least one of the real-time audio data and the processed non-real-time audio data, and information on subtitles. For example, the metadata related to editing of the relay broadcast content may include text-based data of a format such as XML or JSON.

Next, according to one embodiment of the invention, the relay broadcast content transmission unit 230 may function to transmit the real-time video data, the real-time audio data, the processed non-real-time video data, or the processed non-real-time audio data contained in the relay broadcast content and the metadata related to the editing to the viewer device 400 or the external server 500.

Specifically, according to one embodiment of the invention, the real-time video data and real-time audio data contained in the relay broadcast content may be transmitted to the viewer device 400 or the external server 500 while maintaining the state of the raw data received from the photographer device 300. The processed non-real-time video data and processed non-real-time audio data contained in the relay broadcast content may be transmitted to the viewer device 400 or the external server 500 while maintaining the format as extracted from the non-real-time video data and non-real-time audio data.

Meanwhile, when the relay broadcast content is reproduced by the server 500 operating a video platform that restricts the rights of the relayer (i.e., the producer of the relay broadcast content) to the reproduction of the content, it is difficult for the relayer to control the reproduction state of the real-time data or non-real-time data transmitted from the relayer device 200 to the server 500 operating the video platform. Thus, there is a need for measures to prevent time-delayed reproduction of the real-time data or occurrence of stuttering between the real-time data and the non-real-time data, in the relay broadcast content in which the real-time data and the non-real-time data need to be alternately reproduced.

For example, it is common that the server 500 operating a video platform streams the relay broadcast content in a manner that the data transmitted from the relayer device 200 are sequentially reproduced, and time delay may occur in the real-time data when the real-time data and the non-real-time data are alternately reproduced in the relay broadcast content. That is, when the reproduction of the real-time data is interrupted and the reproduction of the non-real-time data is started in the relay broadcast content, the reproduction of the real-time data is stopped at the time point when the reproduction of the non-real-time data is started, and when the reproduction of the non-real-time data is ended, the reproduction of the real-time data is resumed from the stopped point (i.e., the time point when the reproduction of the non-real-time data is started). In this case, the real-time data are inevitably reproduced with a time delay corresponding to the time period for which the non-real-time data are reproduced. (That is, when the non-real-time data are reproduced for 30 seconds, the viewer watches the real-time data captured 30 seconds ago after the reproduction of the non-real-time data is completed). As a result, there arises a problem that the relay broadcast content cannot be provided to the viewer in real time.

In this regard, according to one embodiment of the invention, when the real-time data and the non-real-time data are alternately reproduced in the relay broadcast content, the relay broadcast content transmission unit 230 may control the transmission states of the real-time data and the non-real-time data in order to prevent the time-delayed or stuttering reproduction of the real-time data.

Specifically, according to one embodiment of the invention, when specific processed non-real-time data are inserted in the relay broadcast content during a time period from a first time point to a second time point according to an editing input from the user, the relay broadcast content transmission unit 230 may function to cause the real-time data which has been transmitted as contained in the relay broadcast content not to be transmitted to the viewer device 400 or the external server 500 during the time period from the first time point to the second time point, and to cause the real-time data of which transmission has been interrupted to be transmitted to the viewer device 400 or the external server 500 after the second time point at which the reproduction of the specific non-real-time data is completed, with a time shift corresponding to the time period for which the specific non-real-time data are reproduced.

Further, according to one embodiment of the invention, the relay broadcast content transmission unit 230 may function to cause the specific processed non-real-time data to be transmitted to the viewer device 400 or the external server 500 during the time period from the first time point to the second time point, with a time shift corresponding to a predetermined cycle in terms of frames corresponding to the predetermined cycle in the respective predetermined cycle.

Here, according to one embodiment of the invention, the predetermined cycle may be determined as a time interval between key frames constituting the specific processed non-real-time data.

For example, in a situation where the real-time data are being transmitted in the relay broadcast content, when the processed non-real-time data having a time interval of 1 second between key frames are inserted, the transmission of the real-time data is interrupted while the frames between a first key frame and a second key frame of the processed non-real-time data may be transmitted without a time delay. Further, the frames between the second key frame and a third key frame of the processed non-real-time data may be transmitted with a time shift of 1 second after 1 second from the time point when the transmission of the real-time data is interrupted, and the frames between the $(n+1)^{th}$ key frame and the $(n+2)^{th}$ key frame of the processed non-real-time data may be transmitted with a time shift of n seconds after n seconds from the time point when the transmission of the real-time data is interrupted. Furthermore, in the above example, when the transmission of the non-real-time data is ended and the real-time data are transmitted again, the real-time data may be transmitted with a time shift corresponding to the time period for which the non-real-time data are reproduced from the time point when the transmission of the real-time data is interrupted. Accordingly, the real-time data contained in the relay broadcast content reproduced by the server 500 operating a video platform in which the data transmitted from the relayer device 200 are sequentially reproduced may maintain the real-time properties regardless of whether the non-real-time data are inserted or the time period for which the non-real-time data are reproduced.

Figure 3:
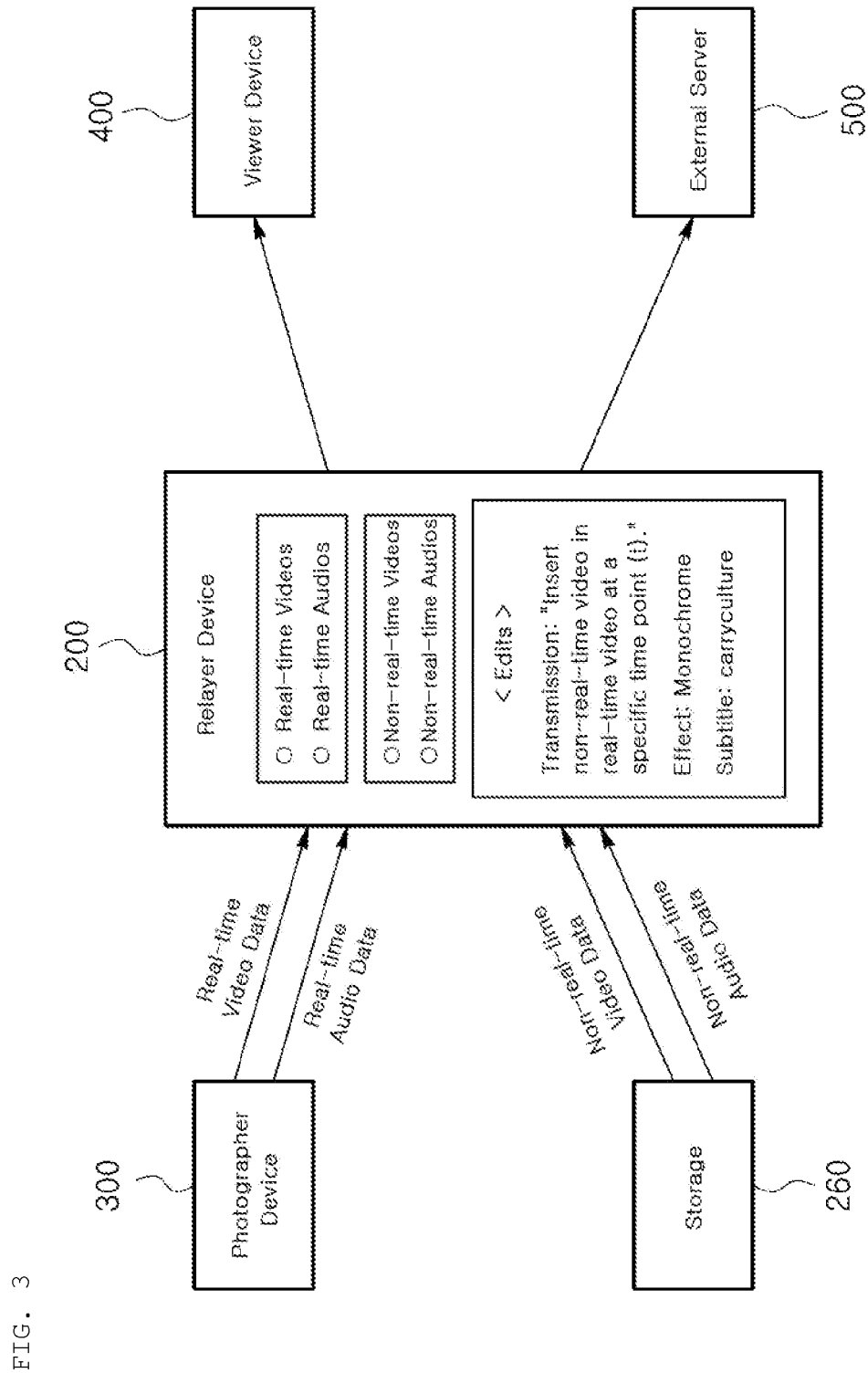
FIG. 3 illustratively shows how a relay broadcast content is produced according to one embodiment of the invention.

FIG. 3 illustratively shows how a relay broadcast content is produced according to one embodiment of the invention.

Referring to FIG. 3, the relayer device 200 may receive real-time video data and real-time audio data from the photographer device 300 through a protocol such as RTSP (Real Time Streaming Protocol) and HTTP (Hyper Text Transfer Protocol), or may capture real-time video data and record real-time audio data using a camera and a microphone provided in the relayer device 200.

Referring further to FIG. 3, the relayer device 200 may acquire non-real-time video data and non-real-time audio data that are pre-stored in a storage 260 or stored in the relayer device 200, according to an editing input from a user.

Next, referring to FIG. 3, the relayer may perform editing of a relay broadcast content containing at least some of the real-time video data, real-time audio data, non-real-time video data, and non-real-time audio data, and information on the editing may be stored as metadata.

Specifically, according to one embodiment of the invention, when the relayer selects the non-real-time video data or non-real-time audio data (e.g., advertisement contents) to be contained in the relay broadcast content, it is possible to extract, from the selected non-real-time video data or non-real-time audio data, processed non-real-time video data or processed non-real-time audio data of the same format as the real-time video data or real-time audio data reproduced adjacent to a time point or time period in which the selected non-real-time video data or non-real-time audio data are to be inserted in the relay broadcast content.

Further, according to one embodiment of the invention, the relayer may perform editing to generate a monochrome effect and display a subtitle, "Carryculture".

Meanwhile, according to one embodiment of the invention, the relay broadcast content editing unit 220 may determine a time code serving as a reference for editing of the relay broadcast content, with respect to synchronized time information that may be acquired from the photographer device 300. Specifically, according to one embodiment of the invention, the time code serving as a reference for editing of the relay broadcast content may be determined with respect to synchronized time information acquired from the photographer device 300 that has transmitted the data received the latest among the real-time video data and real-time audio data contained in the relay broadcast content. Since a plurality of photographer devices 300A and 300B transmitting video data or audio data in real time to the relayer device 200 according to the invention have time information that has already been synchronized through a mobile communication network or the like, it is possible to easily determine a time code between the real-time video data and the real-time audio data and create a temporally seamless relay broadcast content without having to perform a separate synchronizing operation, by utilizing the synchronized time information acquired from any one of the plurality of photographer devices 300A and 300B.

Further, according to one embodiment of the invention, the relay broadcast content editing unit 220 may receive the real-time audio data from only one photographer device 300A among the plurality of photographer devices 300A and 300B and receive only the real-time video data from the other photographer device 300B without receiving the real-time audio data, and may function to allow only the real-time audio data received from one photographer device to be contained in the relay broadcast content. Thus, according to the invention, it is possible to save network resources required for receiving a plurality of real-time audio data from each of the plurality of photographer devices 300A and 300B, and save operation resources required for combining the plurality of real-time audio data in producing a relay broadcast content.

Next, referring to FIG. 3, the relayer device 200 may package the real-time video data, real-time audio data, processed non-real-time video data, or processed non-real-time audio data contained in the relay broadcast content and the metadata related to the editing into a container 310, and transmit the container 310 to the viewer device 400 or the external server 500. Specifically, according to one embodiment of the invention, the real-time video data or real-time audio data contained in the relay broadcast content may be transmitted to the viewer device 400 or the external server 500 while maintaining the state of the raw data received from the photographer device 300, and the processed non-real-time video data or processed non-real-time audio data contained in the relay broadcast content may be transmitted to the viewer device 400 or the external server 500 while maintaining the format as extracted above (i.e., the same format as the real-time video data or real-time audio data).

Next, referring to FIG. 3, the viewer device 400 or the external server 500, which has received the real-time video data, real-time audio data, processed non-real-time video data, or processed non-real-time audio data contained in the relay broadcast content and the metadata related to the editing, may use the aforementioned dedicated application to reproduce the real-time video data, real-time audio data, processed non-real-time video data, or processed non-real-time audio data contained in the relay broadcast content with reference to the metadata related to the editing, so that the relay broadcast content intended by the relayer device 200 may be provided to the viewer.

Meanwhile, according to one embodiment of the invention, the communication unit 240 may function to enable the relayer device 200 to communicate with an external system like the photographer device 300, the viewer device 400, or the external server 500.

Lastly, according to one embodiment of the invention, the control unit 250 may function to control data flow among the data acquisition unit 210, the relay broadcast content editing unit 220, the relay broadcast content transmission unit 230, and the communication unit 240. That is, the control unit 250 may control inbound data flow or data flow among the respective components of the relayer device 200, such that the data acquisition unit 210, the relay broadcast content editing unit 220, the relay broadcast content transmission unit 230, and the communication unit 240 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for supporting a relay broadcast, comprising the steps of:

acquiring real-time data containing videos or audios captured or recorded in real time by at least one device, and acquiring non-real-time data containing pre-stored videos or audios;

according to an editing input from a user, extracting processed non-real-time data of the same format as the real-time data from the non-real-time data, and generating metadata related to editing of a relay broadcast content containing the real-time data and the processed non-real-time data; and transmitting the real-time data and the processed non-real-time data contained in the relay broadcast content and the metadata to another device or an external server.

2. The method of claim 1, wherein the real-time video data and real-time audio data contained in the relay broadcast content are transmitted to the another device or the external server while maintaining a state of raw data received from the at least one device, and the processed non-real-time video data and processed non-real-time audio data contained in the relay broadcast content are transmitted to the another device or the external server while maintaining the format as extracted.

3. The method of claim 1, wherein when specific processed non-real-time data are inserted in the relay broadcast content during a time period from a first time point to a second time point according to the editing input, the real-time data which has been transmitted as contained in the relay broadcast content are not transmitted to the another device or the external server during the time period from the first time point to the second time point, and are transmitted to the another device or the external server after the second time point, with a time shift corresponding to a time period for which the specific non-real-time data are reproduced.

4. The method of claim 3, wherein the specific processed non-real-time data are transmitted to the another device or the external server during the time period from the first time point to the second time point, with a time shift corresponding to a predetermined cycle in terms of a plurality of frames corresponding to the predetermined cycle in the respective predetermined cycle.

5. The method of claim 4, wherein the predetermined cycle is determined on the basis of a time interval between key frames constituting the specific processed non-real-time data.

6. The method of claim 1, wherein the non-real-time data include advertisement content data pre-stored or acquired from an advertiser server.

7. The method of claim 1, wherein the real-time data include first real-time data acquired from a first device and second real-time data acquired from a second device.

8. The method of claim 1, wherein the metadata include at least one of information on switching between the real-time video data or real-time audio data and the processed non-real-time video data or processed non-real-time audio data, and information on combination between the real-time video data or processed non-real-time video data and the real-time audio data or processed non-real-time audio data.

9. A non-transitory computer-readable recording medium having stored thereon a computer program for executing the method of claim 1.

10. A device for supporting a relay broadcast, comprising:
a data acquisition unit configured to acquire real-time data containing videos or audios captured or recorded in real time by at least one device, and acquire non-real-time data containing pre-stored videos or audios;

a relay broadcast content editing unit configured to, according to an editing input from a user, extract processed non-real-time data of the same format as the real-time data from the non-real-time data, and generate metadata related to editing of a relay broadcast content containing the real-time data and the processed non-real-time data; and a relay broadcast content transmission unit configured to transmit the real-time data and the processed non-real-time data contained in the relay broadcast content and the metadata to another device or an external server.

* * * * *